June 10, 1952 W. CULL 2,599,814
HYDROMECHANICAL POWER TRANSMISSION DRIVE
Filed Nov. 23, 1945 4 Sheets-Sheet 4

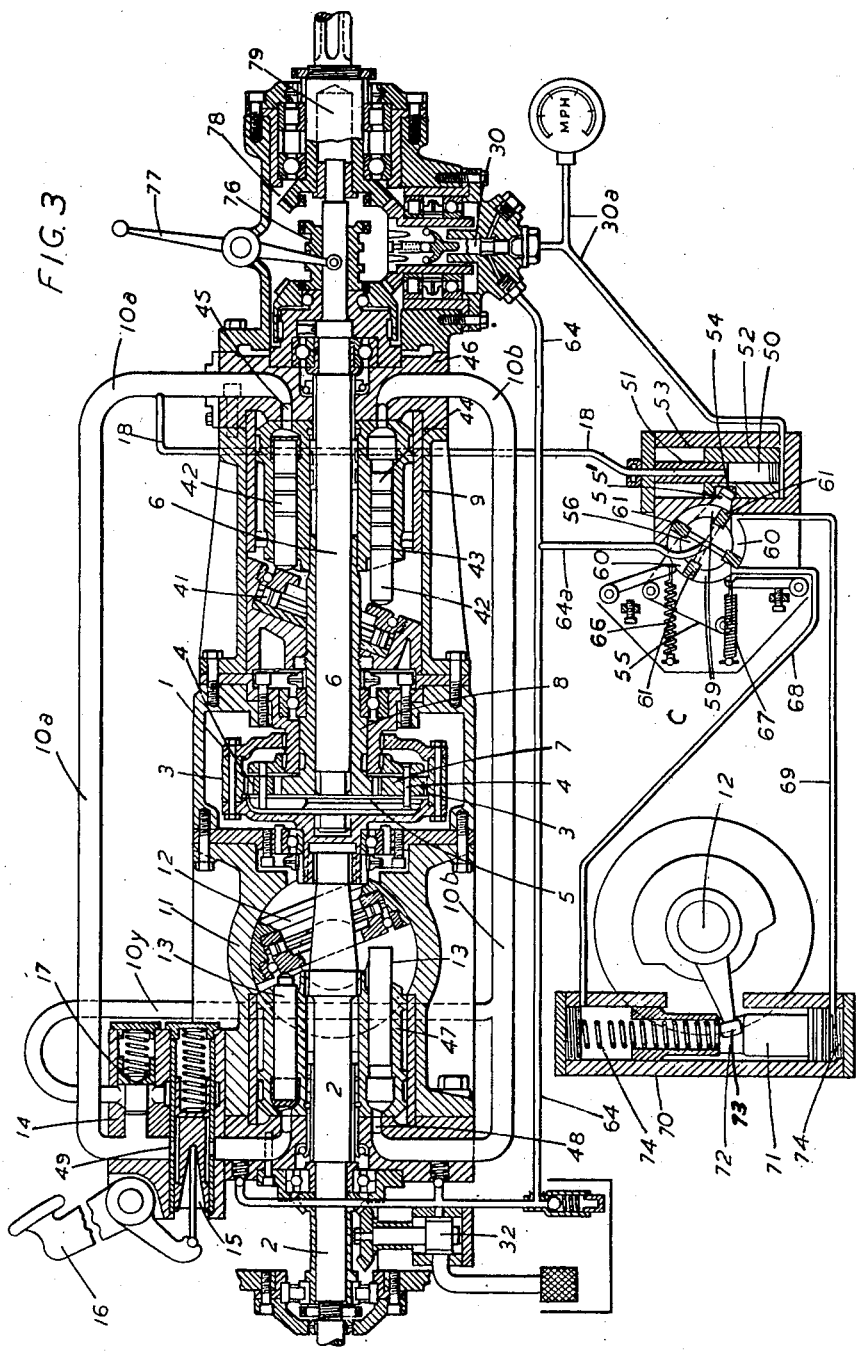

William Cull
Inventor
By Cushman, Darby Cushman
Attys.

Patented June 10, 1952

2,599,814

UNITED STATES PATENT OFFICE 2,599,814

HYDROMECHANICAL POWER TRANSMISSION DRIVE

William Cull, Utley, Keighley, England

Application November 23, 1945, Serial No. 630,451
In Great Britain June 19, 1943

Section 1, Public Law 690, August 8, 1946
Patent expires June 19, 1963

12 Claims. (Cl. 74—687)

This invention relates to hydromechanical power transmission drives wherein the ratio between the power or engine torque and the driving torque has to be varied to suit varying conditions and loads encountered. While the invention will be described as applied to road and rail vehicles it will be understood that it is applicable to all forms of drive such as for instance machine tools where the power and driving torque ratio has to be varied to suit working conditions.

Hitherto this has been effected by numerous methods such as a simple box giving predetermined ratios adapted to be selected by the gear lever and comprising either meshing gear trains or epicyclic gearing.

Hydraulic constructions have been proposed wherein a hydraulic differential is coupled to a differential gear assembly, the hydraulic differential comprising pump and motor units mounted co-axially in a common casing which is adapted to revolve unidirectionally about the axis of the two units. The pump and motor units revolve in the same direction so that the speed of the output shaft is varied by altering the capacity ratios of the two hydraulic units.

A further method has been suggested by which a combined electrical and mechanical transmission is employed for producing a continuously variable ratio between the engine torque and driving torque or resistance based upon a differential action between directly transmitted mechanical power and a D. C. electric machine and consumed by another. The driving torque and consequently the torque ratio is controlled by conventional use of the acceleration pedal and its variation is produced by a small generator whose speed is proportionate to the vehicle's speed.

The chief object of the present invention is to provide a transmission system wherein an infinitely variable gear ratio is obtainable with attendant torque multiplaction without the use of electrical apparatus with the result that a simpler and more efficient driving transmission is possible.

According to the invention the hydro-mechanical power transmission drive comprises a variable ratio torque converter wherein one hydraulic unit is in driving connection with the input gear of an epicyclic train this unit being arranged to have a variable capacity from maximum plus to maximum minus through zero so as to be operable either as a pump or a motor and another hydraulic unit in hydraulic connection with said first mentioned hydraulic unit and in driving connection with the abutment or reaction gear adapted to operate in such a manner that at all times the torque at the input gear of the epicyclic train is the algebraic sum of the engine torque and the hydraulic torque furnished by the reaction between the two hydraulic units by reason of their respective capacity ratios.

The driving torque and therewith the torque ratio, as in the case of a motor road vehicle, is controlled by conventional use of the acceleration pedal, and its variation is effected by a hydraulic governor whose speed is proportionate to the vehicle speed. The torque ratio referred to is the ratio between input and output torques which equals the gear ratio with 100% efficiency. The gear unit may comprise a planetary unit having a ring gear driven from the engine or power unit of the vehicle by way of the input shaft, planet gears mounted upon a carrier associated with the output shaft of the vehicle's driving wheels, and a sun gear mounted upon a hollow shaft which encloses the output shaft.

A hydraulic unit hereafter referred to as the torque unit is driven by the sun gear shaft and may comprise a hydraulic pump which can either deliver, pump, or be driven as a motor, such as either the radial inward type with an eccentric shaft, radial outward type with an eccentric race or a single or opposed swash plate motor. Any rotary or reciprocal hydraulic motor is suitable providing it can both deliver or pump and be driven.

A further hydraulic unit hereafter called the regulator is associated with the input shaft and comprises any rotary or reciprocal hydraulic unit which can either deliver and pump or be driven by reason of its variable capacity from maximum plus to maximum minus through zero.

The torque and regulator units are coupled hydraulically in a closed circuit, arranged to be fed through non-return make up valves by a small auxiliary pump driven from the input shaft and arranged to maintain a pressure of 50 lbs. or more in the closed circuit. The two halves of the circuit are bridged by a by-pass valve which is arranged to by-pass the regulator unit on depression of a pedal with the result that the latter pedal can take the place of the conventional clutch. Incorporated in this by-pass valve is a two-way relief valve designed so as to lift from its seat if the pressure on either side of the circuit reaches a predetermined maximum and in so doing by-passes the regulator unit. This relief valve provides a safety device in the circuit and serves by its setting to limit the maximum torque at the output shaft to any pre-set value, which is a valuable feature in the case of automobile transmissions, as the maximum acceleration can be kept within pre-set limits.

Preferably the capacity or strokes of the regulator unit will be variable from plus to minus through zero to give an effective range in conjunction with the planetary unit from low to high gear. The capacity range of the regulator unit is actuated or controlled from a control unit influenced by a couple, one force acting from or influenced by the fluid pressure in the connecting pipe or hydraulic main between the torque unit and the regulator unit and the other or balancing force by fluid pressure from a governor unit driven by the output shaft of the transmission.

If desired a third force may be applied to the central unit to act as a steadying or balancing medium and be actuated by a hydraulic governor driven by the engine or power unit of the vehicle. This would also limit the maximum revolutions per minute of the engine or power unit thus ensuring the optimum condition throughout the engine gear combination in maximum useful torque.

A convenient capacity relationship or ratio of the regulator unit maximum volume compared with the torque unit maximum volume will be substantially the same as the number of teeth on the ring gear compared with the number of teeth on the sun gear but this is not essential.

In order that the invention may be clearly understood and readily carried into effect the same will now be more fully described with reference to and by the aid of the accompanying drawings, wherein:

Figure 3 is a sectional elevation of a hydromechanical gear constructed in accordance with the invention.

Figure 1:
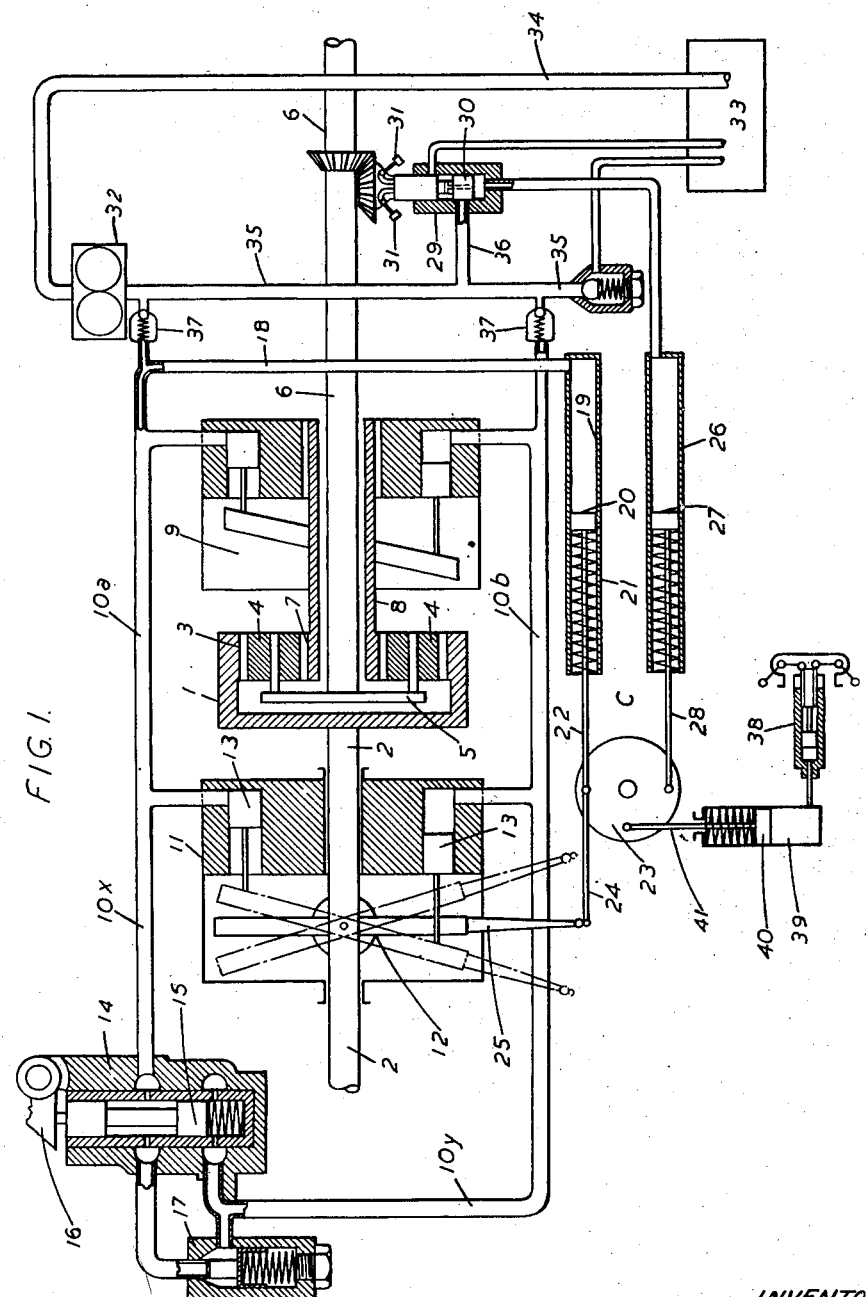
Figure 1 is a diagrammatic illustration of the invention as applied to a transmission suitable for use on a motor road vehicle.
Figure 2:
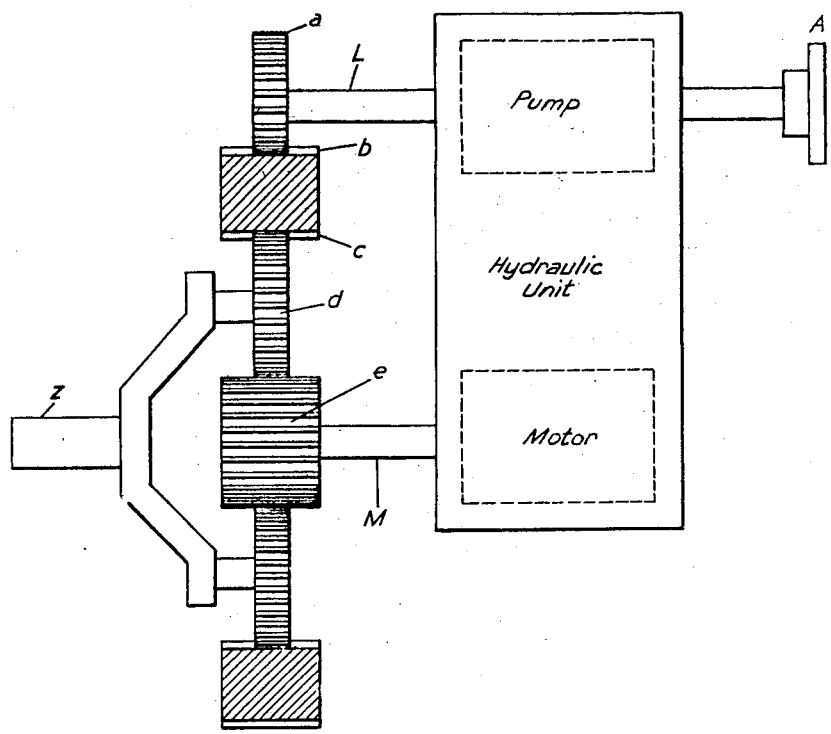
Figure 2 is a diagrammatic view of an alternative layout of gear unit.

Referring to Figures 1 and 2 of the drawings the transmission comprises a gear unit 1 of the epicyclic or planetary type wherein the output shaft 2 from the engine (not shown) or input to the gear unit 1 is connected to a ring gear 3 and the planet pinions 4 are mounted upon a carrier 5 driving the output shaft 6 to the rear axle (not shown) of the vehicle. A sun gear 7 meshing with the planet pinions 4 is mounted on a hollow shaft 8 through which the output shaft 6 passes. Mounted upon the sun gear shaft 8 or in driving connection therewith is a dual purpose hydraulic torque unit 9 comprising a swash plate motor connected through suitable valves by fluid pipe lines 10a and 10b to a hydraulic regulator unit 11 on the input shaft 2. The latter unit 11 is also of the swash plate type but the swash plate 12 on the input shaft 2 is adjustable so that the stroke of the pistons 13 can be varied from maximum plus to maximum minus through zero in which latter position no movement of the pistons 13 is possible.

The two units, 9, 11, respectively are coupled through suitable valve chests (not shown) in a closed circuit 10a, 10b as shown, by which arrangement one fluid pipe 10a becomes a high pressure main and its opposite or return pipe 10b becomes a low pressure main, forming the two halves of the circuit which are separated by the hydraulic units 9 and 11. The high and low pressure mains 10a, 10b are brought into a valve unit 14 comprising a piston valve 15 which may connect the high and low pressure mains 10a, 10b by way of the extension pipe lines 10x and 10y, thus by-passing either of the hydraulic units so that when the torque or regulator unit or both are revolving no power is transmitted to the output shaft 6, due to the oil being by-passed through the valve 15. This valve 15 can be operated by a foot-pedal 16 or a hand lever (not shown) and the unit can thus be arranged to take the place of the transmission or friction clutch in a conventional automotive transmission.

Incorporated in the by-pass valve 15 is a two-way relief valve 17 which relieves both sides of the hydraulic system and is arranged to by-pass oil from either side of the circuit to the other should the pressure in either side exceed a predetermined maximum, thus the torque on the output shaft 6 (which is porportional to the pressure in the hydraulic main) is limited to a safe value either on the drive or over-run, and this has many advantages apart from protecting the mechanism such as the ability to limit by the valve 17 setting the maximum acceleration of any vehicle to which the gear might be fitted.

An additional fluid pipe 18 leads from the high pressure main 10a to a control unit C comprising a cylinder 19 containing a piston 20 acting against a spring 21, said piston 20 having a piston rod 22 connected to an auxiliary control unit or disc member 23 adapted to adjust or vary the position of the swash plate 12 of the regulator 11 by means of a connecting rod 24 and lever 25 associated with the swash plate 12. The cylinder 19 and piston 20 for the present purpose will be called the low gear control.

A further cylinder 26 and piston 27 having a piston rod 28 hereinafter referred to as the high gear control acts upon the auxiliary control unit 23 in a similar and opposite manner to the low gear control and is supplied with oil at a pressure proportional to the speed of the driven shaft 6 through speed sensitive governor unit 29 driven from the said driven or output shaft 6 comprising a "no lap" valve 30 operated by governor weights 31 and to which oil is supplied under pressure from an engine driven pump 32 which draws oil from a make-up tank 33 by way of the pipe 34 and delivers through further pipes 35 and 36 to the valve 30. A "no lap" valve is a valve having no over-lap afforded by a waisted valve when the distance between the lands formed by the waist is equal to the distance between the lands of the coacting surface of the valve body. The fluid in the closed circuit of the high pressure main is maintained at a minimum pressure by means of the spring loaded non return valves 37 fed from the pump 32 and pipe 35 should the pressure fall below the predetermined minimum. A third force may be applied to the control unit 23 by means of an engine driven governor 38 passing fluid to a cylinder 39 having a piston 40 and piston rod 41 connected to the control unit. The fluid pressure in governor valve 38 is self-generated by a plunger within the valve.

The valve 30 includes a valve member 80 slidable in a valve body 81 by the load applied through the governor weights 31 that are rotated by the output shaft 6. The valve member is reduced or waisted at 82 to form a valve chamber 83 and beneath the valve member 80 is a further chamber 84. The chambers 83 and 84 are connected by a duct 85. Inlet and exhaust ports 86 and 87, respectively, are formed in the valve body 81 and are capable of being closed by the valve member 80. It will be seen that when the speed of the output shaft 6 is increased, the valve member 80 is moved downwardly so as to open the inlet port 86 and close the exhaust port 87, with the result that fluid is forced from the pressure pump 32 through the pipes 35 and 36 and inlet 86 into the chamber 83. From this chamber the fluid passes through the duct 85 into the chamber 84 and into the cylinder 26 of the control unit C.

The control unit C which includes the rotary member 23 serves to adjust or vary the position of the swash plate 12 in accordance with the fluid pressure in the cylinders 19, 26 or 39. The cylinder 19 is supplied with pressure fluid built up in the high pressure pipe 10a and constitutes the low or starting gear control and the fluid pressure operates on the spring-loaded piston 20 to rotate the member 23. Opposed to the cylinder 19 and spring-loaded piston 20 is the high gear, cylinder 26 which, as already stated, receives fluid pressure from the valve 30 operating in accordance with the vehicle speed of the output shaft 6 to move the spring-loaded piston 27 and rotate the member 23 in an opposite direction.

A third force which is in the nature of a balancing or damping force is applied to prevent sudden movements of the member 23 by the piston rod 41 and spring-loaded piston in the cylinder 39 to which fluid pressure is supplied from the piston and cylinder engine governor valve 38, this latter acting as a dash-pot.

The pressures in cylinders 19 and 26 are equal because any pressure in 19 is transmitted to 26 through the mechanical interconnection of the pistons 20 and 27 and due to the fact that the valve 30 has closed the exhaust port 87.

The operation of the transmission shown diagrammatically in Figure 1 is as follows: When the car is at rest and the engine turns over, the pressures in the low and high gear cylinders 19 and 26 are equal and the swash plate 12 of the regulator 11 is at its central or zero position, and the valve 14 in the hydraulic system is in the unloaded or by-pass position thus all oil displaced by the torque unit 9 is by-passed and there is no pressure difference across the hydraulic units 9 and 11 other than that necessary to circulate the fluid.

The input shaft 2 and ring gear 3 are rotating while the planet gear carrier 5 and output shaft 6 are stationary with the result that the sun gear 7 and its hollow shaft 8 are rotated in a reverse direction to the input 2, and the valve 14 in the hydraulic system is in the unloaded or by-pass position, thus all oil displaced by the torque unit 9 is by-passed and there is no pressure difference across the hydraulic units 9 and 11 other than that necessary to circulate the fluid.

As the speed of the engine is increased by the conventional use of the accelerator pedal and the by-pass valve 14 is closed by actuation of the foot pedal 16, the rotation of the sun gear hollow shaft 8 operates the swashplate torque unit 9 and fluid under pressure is forced along one of the high pressure fluid pipes 10a to the regulator unit 11, but the swashplate 12 of this latter unit is at its zero position so the fluid is ineffectual and incapable of exerting a driving force in the cylinder and on the piston 13 of the regulator unit 11, and the pressure in the high pressure pipe 10a is built up, thus increasing the re-action between the sun gear 7 and the planet carrier 5 which tends to turn the output shaft 6. This pressure in the high pressure fluid pipe 10a passes along to the connecting pipe 18 to the low gear control cylinder 19 with the result that the swashplate 12 of the regulator unit 11 is moved over gradually to the low gear position by the piston 20 (there being at this time no appreciable pressure in the high gear cylinder as the vehicle is not yet moving forward, except that maintained by the pump 32) and the latter unit 11 commences to be driven by the torque unit 9. Thus the torque on the ring gear 3 is the engine torque plus the regulator unit 11 torque and this torque multiplication is equivalent to low gear in a mechanical transmission.

The planet carrier 5 commences to revolve with the result that the vehicle moves forward. As the speed of the vehicle increases, the rate of rotation of the sun gear 7 decreases with resultant decrease in rotation of the torque unit 9 and lowering of pressure in the main fluid pipe 10a and by-pass pipe 18 to the low gear control. This, and a rise in pressure in the high gear control 26 due to the operation of the governor unit 29 from the output shaft 6, causes the swash plate 12 of the regulator unit 11 to move over to a higher gear and when the swash plate 12 passes zero the regulator unit 11 changes its stroke and instead of being a driven motor becomes a driving pump, and consequently the torque unit 9 slows down, comes to rest and commences to run in the opposite direction, being driven by the regulator unit 11. This results in the gear unit 1, namely the ring gear 3, the planet carrier 5 and sun gear 7 rotating as one in the same direction to form a direct drive. As the output of the regulator unit 11 increases, so the speed of the torque unit 9 rises by reason of the capacity ratios between them and the rate of rotation of the sun gear 7 is increased with the result that an overdrive takes place.

The relative rotation and operation of the regulator unit 11 and torque unit 9 and particularly the fluid pressure in the high pressure main 10a is proportionate to the resistance to be overcome at the road wheels. The pressure in the high gear cylinder 26 is proportional to the square of speed of the vehicle because the pressure to control the cylinder 26 varies as the R. P. M. and is controlled by the speed sensitive governor 29, thus when the accelerator pedal is released and the vehicle overruns the engine, e. g. the output shaft 6 is being driven by the road wheels, the pressure in the high pressure main is considerably reduced, but as the vehicle's speed is still the same, the pressure in the high gear cylinder 26 remains the same, thus the pressure differential across the control unit 23 is increased and the swashplate of the regulator unit is moved over into its highest gear position, with the result that the engine runs at a relatively low speed with a consequent saving in fuel.

Figure 4:
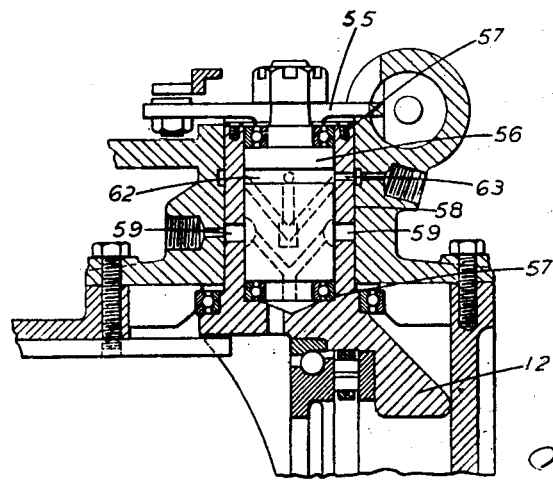
Figure 4 is a sectional plan showing the servo actuating mechanism and one trunnion of the swash plate.
Figure 5:
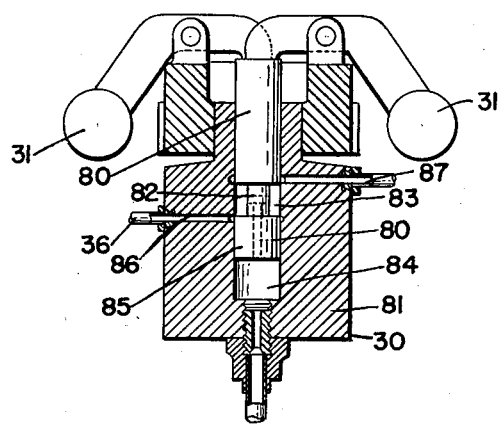
Figure 5 is a detail sectional view of the "no-lap" valve and its associated parts.
Figure 6:
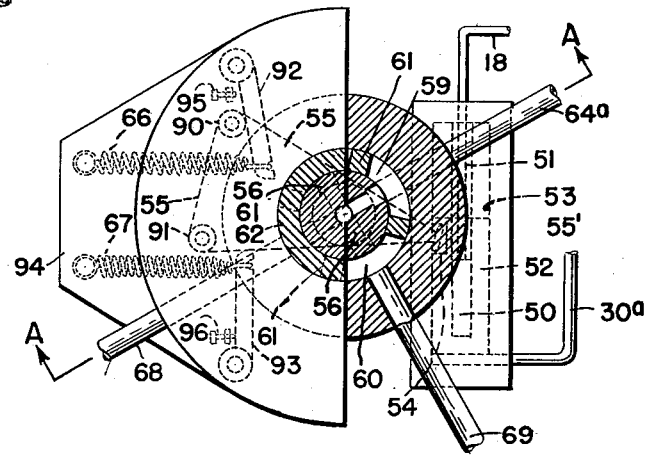
Figure 6 is a detail sectional view of the servo valve and its associated parts and is taken on the line B—B of Figure 7.

Referring to Figures 3 and 4 of the drawings the transmission drive comprises a gear unit 1 of the epicycle or planetary type whose input shaft 2 is connected to the ring gear 3 and the planet pinions 4 are mounted upon a carrier 5 driving the output shaft 6. A sun gear 7 meshing with the planet pinions 4 is mounted upon a hollow shaft 8 through which the output shaft 6 passes. Mounted upon the sun gear shaft 8 is a dual purpose hydraulic torque unit 9. The torque unit comprises a non-rotating swash plate 41 engaged by pistons 42 in a rotating block 43 which carries the cylinders 44 of the motor or unit 9. The cylinders 44 are connected to the high and low pressure mains 10a and 10b through a valve chest 45 in the fixed casing 46. The pressure mains 10a and 10b lead to a hydraulic regulator unit 11 also of the swash plate type having a non-rotating swash plate 12 cooperating with pistons 13 within a rotating cylinder block 47 keyed to the input shaft 2 of the gear unit 1.

The cylinder block 47 abuts a valve chest 48 to which the high and low pressure mains 10a—10b are connected.

The high pressure main 10a passes through a valve unit 14 comprising a piston valve 15 which may connect the high and low pressure mains through the by-pass port 49 and extension pipe 10y, thus by-passing either of the two hydraulic units with the result that when the torque or regulator units 9 and 11 or both are revolving no power is transmitted to the output shaft 6. The valve 15 is operated by a footpedal 16 and can be arranged to take the place of the transmission or friction clutch for disengagement in a conventional automotive transmission. Incorporated in the by-pass valve unit 14 is a two-way relief valve 17 arranged to by-pass oil from either side of the circuit to the other should the pressure in either side exceed a predetermined maximum. In other words, the valve 17 by reason of its spring-loaded stepped piston opens and interconnects both pipes leading to it when the pressure in either pipe overcomes the spring. The high and low gear control unit C is connected by a fluid pipe 18 from the high pressure main 10a and leads to a cylinder 50 of the control unit C which is a servo actuated mechanism. The cylinder 50 is closed by a stationary piston 51 which has an axial hole through which the fluid is led. The cylinder bore 50 is formed inside a movable piston 52 having a blind end, the piston 52 being accommodated within a further cylinder bore 53. The piston 51 and its associated cylinder 50 represent the low gear control whilst the piston 52 and its associated bore 53 represents the high gear control. Pressure fluid is received in cylinder bore 53 from the speed sensitive governor valve 30 driven from the output shaft 6 of the gear unit at vehicle speed. The pressure conduit from the valve 30 is tapped and connected to a pressure gauge adapted to read in miles per hour as the pressure in the conduit 30a is proportional to the speed of the vehicle. Also it will be seen that the pressure in the conduit 10a by way of pipe 18 is opposing the pressure in the conduit 30a.

The piston 52 is provided with a milled slot 54 which engages with a spherical ended lever 55'. This lever 55' is mounted and connected to a servo valve 56, the servo valve being housed concentrically in the trunnion of the swash plate 12 as shown in Figure 4. The valve is made sensitive to rotational torque by reason of its mounting, the valve is provided at each end with two deep groove ball bearings 57, the outside diameter of which is 5–10 thousandths greater than the diameter of the valve, this assembly being mounted in a parallel bore 58. The valve surface is then clear of the bore surface by a space sufficient only to accommodate a thin film of oil. The bore 58 is provided with four ports 59 and 60 equally disposed around its circumference. These are adapted to co-operate with diametrically drilled ports in the valve 56. The port apertures in valve 56 are of the same width as the bars 61 separating the ports in the bore 58.

The valve 56 has also a circumferential groove 62 engaging with communicating holes and passages 63 which in turn are connected via conduit 64a to make-up pressure line 64 in which a constant pressure of 100/120 lbs. is maintained by the pump unit 32.

Figure 7:
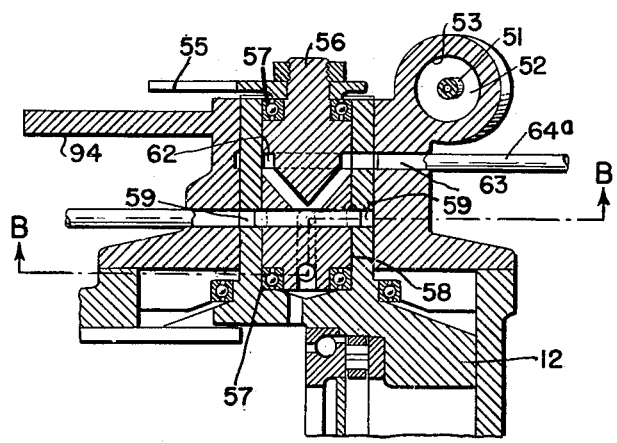
Figure 7 is a sectional view taken substantially along the line A—A of Figure 6.

The lever or arm 55 is constrained by springs 66 and 67 to its centered position. Any effort on the piston 52 due to pressure difference in the cylinders 50 or 53 reacts on one or other of the springs 66 and 67 and by this means the valve 56 is given partial rotation. Movement of the piston 52 moves the part $55^1$ at the spherical end of the pivotal lever or arm 55 (Fig. 7) to rotate said pivotal lever or arm 55 and partially rotate the valve 56. The pivotal lever or arm 55 is provided with two abutments 90, 91 which engage with pivotal levers 92, 93 according to the direction of rotation of said lever or arm 55 and said pivotal levers 92, 93 are each provided with a spring 66, 67 anchored to the fixed plate 94 which forms part of the fixed casing of the valve. Adjustable stops 95, 96 are provided on the plate to limit the movements of the levers 92, 93 under the action of their respective springs 66, 67. In the centered position the diametrical ports in the valve 56 are closed by the bars 61 separating the ports 59 and 60. It will be seen then, that from this coincidence or centered position any partial rotation of the valve 56 will cause the diametrical port in said valve, which is in communication with the pressure line 64a, to feed oil into the diametrically opposite ports 59 or 60 according to whichever direction the valve is displaced from its coincidence position.

Leading from the ports 59 and 60 are fluid conduits 68 and 69 which are in communication with each end of a servo cylinder 70.

For the sake of clearness the servo cylinder and servo unit already described are shown as a mirror view that is one part displaced substantially 180° from the other in Fig. 3 of the drawings. A servo piston 71 is housed in the cylinder 70 the piston being connected by means of diametrical drilling 72 to the ball ended lever 73 which is keyed to the swash plate 12. Thus the latter swash plate has the ball ended lever 72 and the aforementioned servo valve 56 diametrically mounted at opposite sides thereof.

Any axial movement of the piston 71 in the cylinder 70 is communicated to the swash plate 12 of the regulator 11. The piston 71 is conveniently made hollow to house a pair of centering springs 74 so that when the unit is at rest, i. e. no pressure difference in conduits 10a and 10b, the valve and swash plate 12 are automatically centered.

It will be seen then that any pressure difference in conduits 68 and 69 which is brought about by rotation of the valve 56 will cause the piston 71 to have axial movement in its cylinder 70 and from this, through the medium of lever 73, the swash plate 12 will be moved through an angle which is determined by the angular displacement of the valve 56 by virtue of the fact that the bore 58 is formed in the trunnion of the swash plate 12. Any angular movement of 12 and 58 about the axis of 56 will cause the bars between ports 59 and 60 to close the diametrical port in the valve 56 thus arresting the fluid flow and restoring the pressure balance in conduits 68 and 69 across the servo piston 75. Any tendency for the piston 71 to wander from its dictated position is countered by the opening of the ports in 56 and 58 thus immediately applying a counterfluid pressure which effectively maintains the swash plate 12 at the angle dictated by the angular displacement of the valve 56 from its centered position.

Reverse gear is effected by means of a sliding clutch 76 keyed on the output shaft 6 and controlled by means of reverse lever 77.

The clutch for the purpose of engaging reverse is slid rearwardly to engage the gear 78 mounted on a final drive shaft 79 from the gear unit.

In order that the torque multiplication of the gear unit may be more clearly understood, Figure 2 of the drawings is a diagrammatic view drawn to accompany the following explanatory formulae wherein $A$=power input; $Z$=output; $a, b, c, d$ and $e$=numbers of teeth.

1. Reduction ratio

Let $R$=overall gear reduction of complete assembly, and $$r=\text{ratio of } \frac{\text{pump capacity per rev.}}{\text{motor capacity per rev.}}$$

Then it can be shown that the overall gear reduction $$R=\left\{\frac{1}{\pm r\left[\frac{1}{1+\frac{c}{e}}\right]+\left[\frac{\frac{a}{b}}{1+\frac{e}{c}}\right]}\right\} \quad (1)$$

observing that $r$ in the denominator is positive when pump and motor turn in same direction, and negative when pump and motor turn in opposite directions when viewed from Z. Observe also that if the expression in { } comes out positive, then Z and A turn in the same direction; if negative, Z revolves oppositely to A.

Whilst the invention has been described using a differential gear of the epicyclic-ring gear type it will be understood that any suitable differential gear may be employed, provided three moving elements are present, the input shaft, a planet carrier and output shaft.

What I claim is:

1. A power transmission comprising an input shaft, an output shaft, an epicyclic gear unit having a ring gear, planet pinions, and a sun gear, said ring gear being operatively connected to the input shaft, means operatively connecting the planet pinions to the output shaft, a hollow shaft encircling the output shaft and operatively connected to said sun gear, a torque unit operatively connected to said hollow shaft, a hydraulic regulating unit operatively connected to said input shaft, said torque and regulating units being communicably connected by pipe lines that communicate with each other to provide a closed fluid circuit, means for supplying fluid under pressure to the closed fluid circuit, one of said pipe lines constituting a high pressure main and the other pipe line a low pressure main, a valve unit for controlling communication of the high pressure main with the low pressure main, a control unit communicating with the high pressure main, means operatively connecting the control unit to the regulator unit, and governor means operatively connected to the output shaft and said control unit for operating the latter in accordance with the speed of the output shaft.

2. A power transmission comprising an input shaft, an output shaft, an epicyclic gear unit having a ring gear, planet pinions, and a sun gear, said ring gear being operatively connected to the input shaft, means operatively connecting the planet pinions to the output shaft, a hollow shaft encircling the output shaft and operatively connected to said sun gear, a torque unit operatively connected to said hollow shaft, a hydraulic regulating unit operatively connected to said input shaft, said torque and regulating units being communicably connected by pipe lines that communicate with each other to provide a closed fluid circuit, means for supplying fluid under pressure to the closed fluid circuit, one of said pipe lines constituting a high pressure main and the other pipe line a low pressure main, a valve unit for controlling communication of the high pressure main with the low pressure main, a control unit communicating with the high pressure main, said control unit including a low gear control and a high gear control, means operatively connecting the low gear control to the high pressure main, means operatively connecting the low gear control to the regulator unit for operating the latter in one direction, means operatively connecting the high gear control to the regulator unit for operating the same in an opposite direction to that of the low gear control, and governor means operatively connected to the output shaft and the high gear control for operating the latter in accordance with the speed of the output shaft.

3. A power transmission comprising an input shaft, an output shaft, an epicyclic gear unit having a ring gear, planet pinions, and a sun gear, said ring gear being operatively connected to the input shaft, means operatively connecting the planet pinions to the output shaft, a hollow shaft encircling the output shaft and operatively connected to said sun gear, a torque unit operatively connected to said hollow shaft, a hydraulic regulating unit operatively connected to said input shaft, said torque and regulating units being communicably connected by pipe lines that communicate with each other to provide a closed fluid circuit, means for supplying fluid under pressure to the closed fluid circuit, one of said pipe lines constituting a high pressure main and the other pipe line a low pressure main, a valve unit for controlling communication of the high pressure main with the low pressure main, a control unit communicating with the high pressure main, said control unit including a low gear control and a high gear control, means communicating the low gear control to the high pressure main, a rotary member operatively connected to said regulator unit, means operatively connecting the low gear control to said rotary member for operating the control unit in one direction, means operatively connecting the high gear control to the rotary member to operate the regulator unit in an opposite direction to that of the low gear control, an engine driven pump communicating with said high gear control for supplying fluid pressure thereto, and governor means operatively connected to the output shaft and said high gear control for operating the latter in accordance with the speed of the output shaft.

4. A power transmission comprising an input shaft, an output shaft, an epicyclic gear unit having a ring gear, planet pinions, and a sun gear, said ring gear being operatively connected to the input shaft, means operatively connecting the planet pinions to the output shaft, a hollow shaft encircling the output shaft and operatively connected to said sun gear, a torque unit operatively connected to said hollow shaft, a hydraulic regulating unit operatively connected to said input shaft, said torque and regulating units being communicably connected by pipe lines that communicate with each other to provide a closed fluid circuit, means for supplying fluid under pressure to the closed fluid circuit, one of said pipe lines constituting a high pressure main and the other pipe line a low pressure main, a valve unit for controlling communication of the high pressure main with the low pressure main, a control unit communicating with the high pressure main, said control unit including a low gear control and a high gear control, means communicating the low gear control to the high pressure main, a rotary member operatively connected to said regulator unit, means operatively connecting the low gear control to said rotary member for operating the control unit in one direction, means operatively connecting the high gear control to the rotary member to operate the regulator unit in an opposite direction to that of the low gear control, a governor operating means connected to said rotary member for providing a steadying or balancing means for the control unit, and means operatively connected to the output shaft and said high gear control means for operating the latter in accordance with the speed of the output shaft.

5. A power transmission mechanism according to claim 1 wherein the valve unit includes a by-pass valve operable to cause the fluid pressure to by-pass the regulator unit.

6. A power transmission mechanism according to claim 2 wherein the control unit is influenced by a couple, one force being applied by fluid pressure in the high pressure main through a connecting pipe to a cylinder and piston connected to the control unit to constitute the low gear control and the valve unit has a by-pass valve operable to cause the fluid pressure to by-pass the regulator unit.

7. A power transmission mechanism according to claim 2 wherein the control unit is influenced by a couple, one force being applied by fluid pressure in the high pressure pipe line through a connecting pipe to a cylinder and piston connected to the control unit to constitute the low gear control, an engine driven pump adapted to supply fluid at varying pressures to a cylinder having a piston connected to the control unit to constitute the high gear control, and said valve unit having a by-pass valve operable to cause the fluid pressure to by-pass the regulator unit.

8. A power transmission mechanism according to claim 1 wherein a two-way relief valve communicates with the valve unit and is adapted to open if the pressure on either side of the fluid circuit reaches a predetermined maximum and thereby by-pass the regulator unit.

9. A power transmission mechanism according to claim 2 wherein the control unit is influenced by a couple, one force being applied by fluid pressure in the high pressure main through a connecting pipe to a cylinder and piston connected to the control unit to constitute the low gear control and a two-way relief valve communicates with the valve unit and is adapted to open if the pressure on either side of the fluid circuit reaches a predetermined maximum and thereby by-pass the regulator unit.

10. A power transmission mechanism according to claim 2 wherein the control unit is influenced by a couple, one force being applied by fluid pressure in the high pressure main through a connecting pipe to a cylinder and piston connected to the control unit to constitute the low gear control, an engine driven pump adapted to supply fluid at varying pressures to a cylinder having a piston connected to the control unit to constitute the high gear control and a two-way relief valve communicates with the valve unit and is adapted to open if the pressure on either side of the fluid circuit reaches a predetermined maximum and thereby by-pass the regulator unit.

11. A power transmission mechanism according to claim 1 wherein the fluid circulates in a closed circuit in which a predetermined minimum pressure is maintained by means of an engine driven oil pump adapted to deliver oil from a make-up tank into the circuit through non-return valves should the pressure in the circuit fall below the predetermined minimum.

12. A power transmission mechanism according to claim 2 wherein the control unit is influenced by a couple, one force being applied by fluid pressure in the high pressure main through a connecting pipe to a cylinder and piston connected to the control unit to constitute the low gear control, and the fluid circulates in a closed circuit in which a predetermined minimum pressure is maintained by means of an engine driven oil pump adapted to deliver oil from a make-up tank into the circuit through non-return valves should the pressure in the circuit fall below the predetermined minimum.

WILLIAM CULL.

REFERENCES CITED

The following references are of record in the file of this patent:

UNITED STATES PATENTS

| Number | Name | Date |
|---|---|---|
| 1,197,789 | Bluemel | Sept. 12, 1916 |
| 1,951,345 | Centervall | Mar. 20, 1934 |
| 1,981,805 | Kacer | Nov. 20, 1934 |
| 2,139,965 | Ljungstrom | Dec. 13, 1938 |
| 2,153,997 | Verderber | Apr. 11, 1939 |
| 2,173,855 | Orshansky | Sept. 26, 1939 |
| 2,219,052 | Orshansky | Oct. 22, 1940 |
| 2,256,324 | Orshansky | Sept. 16, 1941 |
| 2,285,431 | Grossenbacher | June 9, 1942 |